R. HOOPES.
WHEEL.
APPLICATION FILED APR. 2, 1920.
1,384,194.
Patented July 12, 1921.
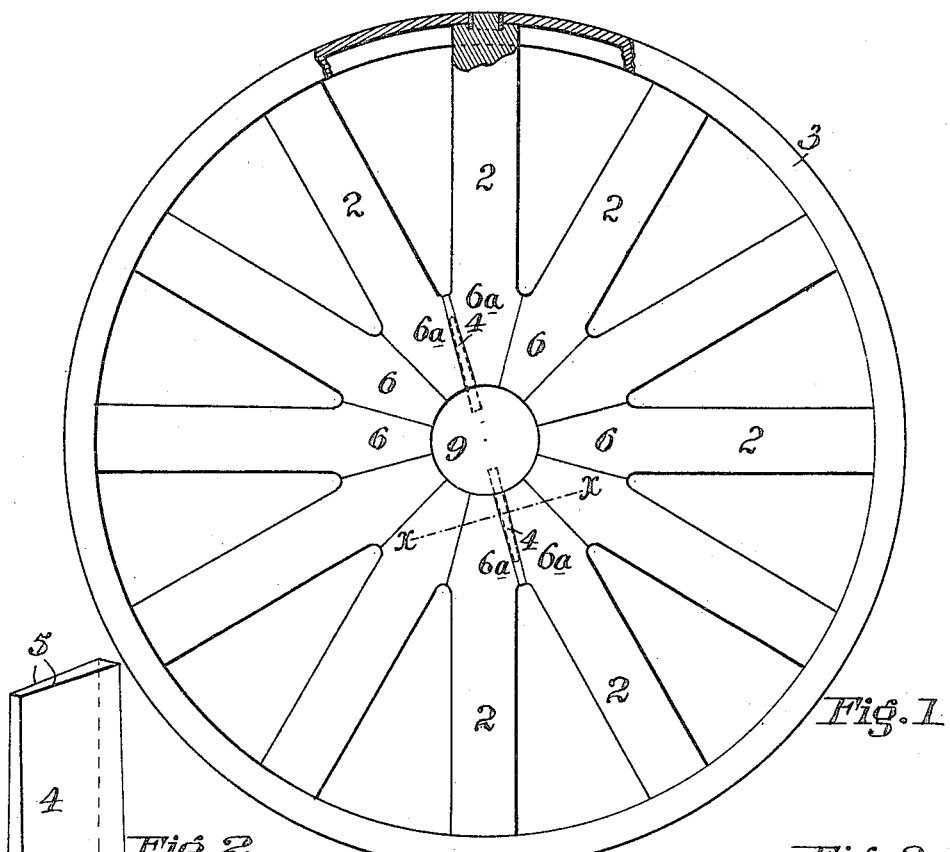
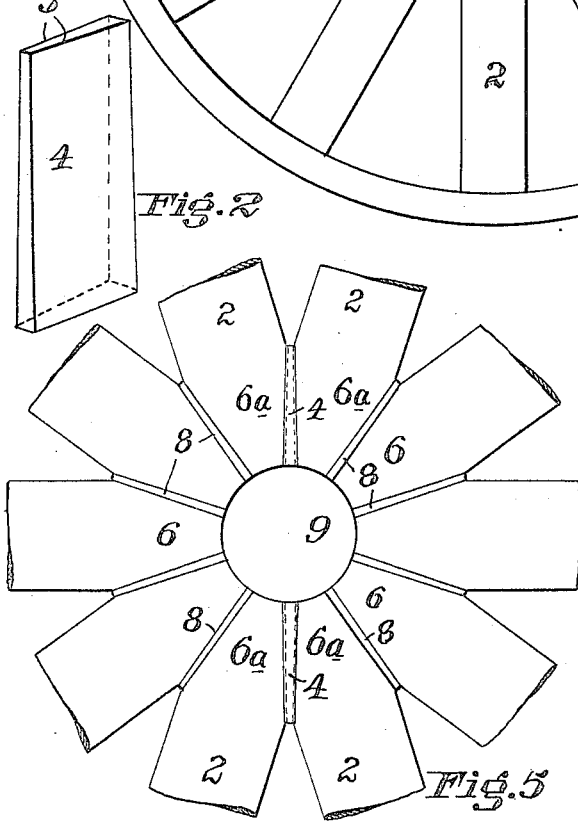
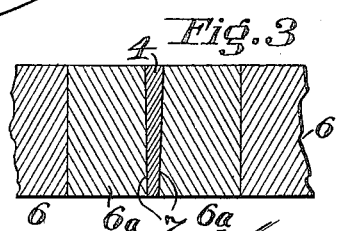
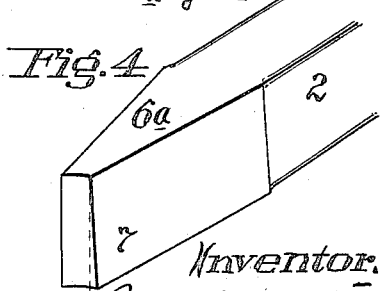
Inventor.
Russell Hoopes

UNITED STATES PATENT OFFICE.

RUSSELL HOOPES, OF WEST CHESTER, PENNSYLVANIA.

WHEEL.

1,384,194.     Specification of Letters Patent.     Patented July 12, 1921.

Application filed April 2, 1920. Serial No. 370,635.

*To all whom it may concern:*

Be it known that I, RUSSELL HOOPES, a citizen of the United States, and resident of West Chester, county of Chester, and State of Pennsylvania, have invented an Improvement in Wheels, of which the following is a specification.

My invention has for its object the construction of a wheel adapted to commercial motor wagons, military, and other uses, wherein great strength and durability, coupled with special adaptability for speedy and easy repairs, are embodied.

My invention relates more particularly to that class of wheels set out in Letters Patent No. 1,310,189, granted to me on July 15, 1919, wherein the keys employed in securing the hub ends of the spokes in rigid connection are driven radially outward between the adjacent spoke sections, and my present improvements are more particularly directed to the construction and adaptability of certain improvements in the keys and their association with the tapered spoke ends constituting a portion of the hub of the wheel.

As disclosed in my former patent aforesaid, the tapered inner ends of the spokes were locked in annular arrangement by keys having very slight taper and driven radially outward between the tapered spoke ends, but I have found that where the hole or aperture through the hub of the wheel is relatively small in diameter, there is not sufficient space for proper insertion and outward driving of the keys, and it is more particularly to overcome this condition that my present invention is directed.

In carrying out my present invention, the inner ends of the spokes are tapered and made to directly contact with each other, except in one or more places, and my improved keys introduced between the tapered spoke ends at these places. Aside from the introduction of my improved keys at one or more places between the tapered spoke ends, keys having radial taper alone may be introduced between the remaining tapered spoke ends substantially as indicated in my aforesaid Letters Patent, in which case the final locking into rigidity of the hub ends of the spoke is insured by the employment of my special construction of key having taper not only in a radial direction, but also in a transverse direction. By the employment of a key of this character, the same may be inserted sidewise in position among the assembled spokes and then driven radially outward, whereby such a key may be employed with a relatively small hub aperture.

With the above and other objects in view, the nature of which will be more fully understood from the description hereinafter, the invention consists in the novel construction of wheels, as hereinafter more fully described and defined in the claims.

Referring to the drawing: Figure 1 is a side elevation of a wheel embodying my invention; Fig. 2 is a perspective view of one of the improved wedges; Fig. 3 is a cross section on line *x—x* of Fig. 1, showing the special wedge in position; Fig. 4 is a perspective view of the hub end of the spoke embodying my invention; and Fig. 5 is a modified form of my improved hub construction.

2 are the spokes of the wheel, 3 the rim thereof and 6 the inner tapered ends of the spokes which, when arranged in assembled form, constitute a substantially annular hub. In the particular construction shown in Fig. 1, the tapered spoke hub ends of the spokes are preferably formed of radial surfaces so that they abut snugly with the exception of two pairs, between the spokes of each pair of which there is interposed a locking wedge or key 4. As will be seen from Fig. 1, the spokes are abutted at their hub ends to form substantially two semicircular sections and these are wedged in definite relation by the keys 4 which are arranged on diametrically opposite sides of the hub aperture 9. The general shape of the key or wedge 4 is shown in Fig. 2, from which it will be seen that it tapers longitudinally and also transversely, the transverse taper being indicated at 5. By reference to Fig. 3, it will be seen that this transverse taper 5 provides a transverse wedge action between the spoke ends 6ª, and permits the said wedges to be inserted into preliminary position from the side of the wheel hub, as indicated in dotted lines in Fig. 1, and thereafter driven radially outward to the final position indicated by solid lines in Figs. 1 and 5. The extent of the transverse taper may be varied according to the permissible diameter of the hole 9, it being understood that where the hole is large, the amount of transverse taper in the key may be somewhat less than where the hole is relatively small, as in the latter case there is less possibility of radial movement to the key in finally locking the spoke ends in position.

It will also be noted that in the particular construction shown in Fig. 1, the pairs of spokes which are separated by the keys 4 have their opposite faces of their tapered ends differently shaped, because where the said spokes each have a radial surface they also have the opposite surfaces beveled not only in a radial direction, but also in a transverse direction, the latter being indicated at 7 and in Figs. 3 and 4. Owing to the fact that the key 4 is somewhat tapered in a radial direction, it follows that the abutting surfaces of the spokes are not radial to the axis of the wheel, but on the contrary are somewhat inclined to a radial plane through the axis, to provide the taper required by the key.

In the modified construction shown in Fig. 5, wherein the keys 4 are employed as in Fig. 1, there are also employed a plurality of additional keys 8 (without transverse taper) which are respectively arranged between the adjacent tapered spoke ends 6, and said keys 8 may be formed with a slight taper with the smallest width directed radially outward, or if desired, the said taper may be nominal, so that they constitute merely spacing strips between the spokes, and transfer the thrust from one spoke to the next at the hub.

While I have shown use in the hub of two of the special wedges or keys 4 having both longitudinal and transverse taper, it is to be understood that one or more of said keys or wedges may be employed as preferred, and I, therefore, do not restrict myself to the number of these special keys or wedges. It is even possible that all of the keys 8 in Fig. 5 may also be similar to the keys 4, but as there is no necessity or special gain by employing so many of these keys of special construction, it is my opinion that best commercial results will be attained by the employment of two of the said keys 4 as has been specifically indicated in the drawing, as the preferred construction.

The rim or felly 3 of the wheel may be of any suitable construction and I do not restrict myself in this respect. In practice, this rim is preferably of rolled steel and provided with sockets or apertures into which the ends of the spokes fit to properly position them and to take the radial thrust when the spokes are keyed into final shape.

Any suitable tire may be applied to the rim, such details not forming any part of my invention.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A wheel comprising a rim, a plurality of spokes fitted thereto and having tapered hub ends adapted to form an annular hub portion, and a tightening key interposed between two of the tapered spoke ends and driven radially between them, said key being tapered both longitudinally and transversely whereby it may be inserted sidewise between the hub ends of the spokes and then driven radially between them.

2. The invention according to claim 1, further characterized by having the hub ends of the spokes arranged in two semi-circular spoke assemblages, and an additional tightening key of the character stated driven radially between adjacent hub ends of the spokes on a diametrically opposite portion of the hub to that at which the first mentioned key is arranged, whereby the two semi-circular spoke assemblages are locked in fixed relation by the tightening keys to form a rigid annular hub.

3. In a wheel, adjacent tapered spoke hub ends having the opposing surfaces thereof so inclined to each other as to provide a radially tapered space with the largest width at the end to the hole in the hub, and said surfaces also inclined to each other in a lateral direction to provide a transverse taper also to the space, in combination with a tightening key having taper both longitudinally and transversely, said key inserted into the space sidewise and driven radially outward between the surfaces of the hub ends of the spokes.

4. A wheel comprising a rim, a plurality of spokes fitted thereto and having tapered hub ends to form an annular hub portion with a hub opening and in which a plurality of the hub ends of the spokes are abutted, and further having the opposing surfaces of the tapered hub ends of two of the spokes spaced apart with a maximum width of separation next to the inner hub opening, and a key tightly filling said space between the tapered spoke ends and of a shape which will be self-acting to hold it in position.

5. The invention according to claim 4, further characterized by having an additional space between the tapered hub ends of the spokes and said space filled with an additional key, whereby the tapered hub ends of the spokes may be tightly clamped together by keys arranged at intervals circumferentially of the hub.

6. The invention according to claim 4, wherein the key is tapered and driven radially outward to position the spokes and make a rigid hub body.

In testimony of which invention, I hereunto set my hand.

RUSSELL HOOPES.